Patented Sept. 26, 1944

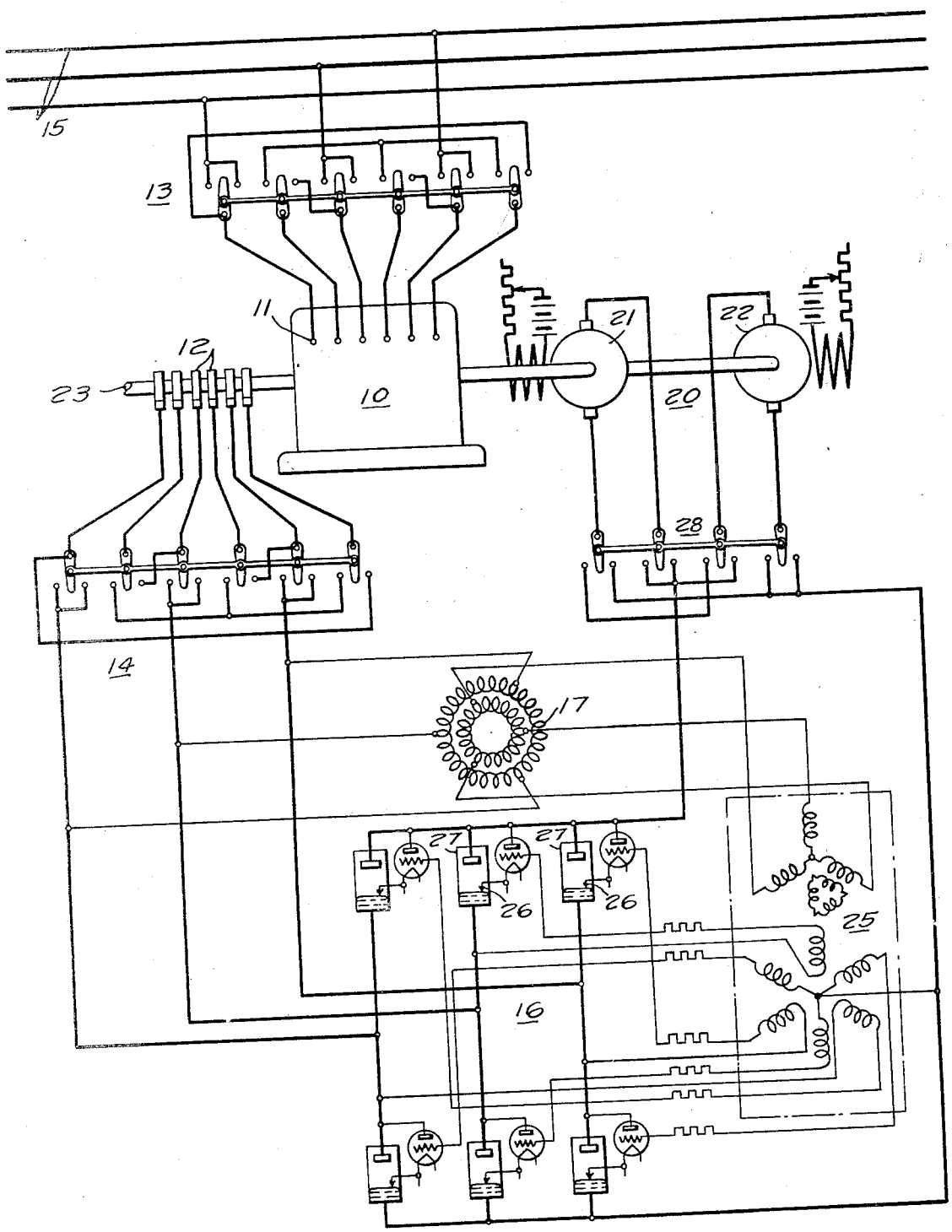

2,359,145

UNITED STATES PATENT OFFICE 2,359,145

VARIABLE SPEED MOTOR DRIVE

Henry C. Myers, Geneva, and Lee A. Kilgore, Forest Hills, Pa., assignors to Westinghouse Electric & Manufacturing Company, East Pittsburgh, Pa., a corporation of Pennsylvania Application January 28, 1943, Serial No. 473,830

4 Claims. (Cl. 172—274)

Our invention relates to a variable speed motor drive and particularly to a system for securing variable speed drives with an economical use of the control apparatus.

It has heretofore been proposed to provide a variable speed drive operable over a wide speed range by providing a wound rotor induction motor with a controlled rectifier for rectifying the output of the wound rotor and feeding the wound rotor output to a direct current motor coupled mechanically in driving relation with the alternating current motor.

This system has presented certain disadvantages in that the secondary output has a wide voltage and frequency range over the operating range of the motor. As a consequence, it has been necessary to provide rectifying and direct current equipment capable of operating at the maximum voltage output of the rotor.

According to our invention this difficulty is corrected by providing switching means for changing the connections of the primary and secondary windings of the induction motor to secure the maximum benefits of voltage correction by means of winding connections. Also we propose to provide the direct current motor either in two sections or having parallel or split windings, so that the windings may be operated either in parallel or in series. By this means we are able to utilize a greatly reduced rating of rectifier and direct current motor equipment while operating over an extended speed range.

It is an object of our invention to provide a variable speed motor operable over an extended speed range with a minimum variation of terminal output voltage of the regulated motor.

It is a further object of our invention to provide a variable speed motor drive utilizing the equipment to the greatest possible advantage.

It is a further object of our invention to provide a variable speed motor operating with maximum power factor.

Other objects and advantages of our invention will be apparent from the following detailed description taken in conjunction with the accompanying drawing in which the single figure is a schematic illustration of a motor drive embodying our invention.

In an exemplary embodiment of our invention according to the drawing, a wound rotor induction motor 10 is provided in which the phase terminals 11 and 12 of both the primary and secondary windings have been brought out to switching arrangements 13 and 14 which permit the windings to be connected either in star or in polygon. For purposes of illustration, we have shown a three-phase alternating current system 15 connected to three motor windings (not shown) by means of a switching mechanism 13 which can be adjusted to connect the primary windings either in star or in polygon. Likewise, the secondary terminals 12 are brought out to a switching mechanism 14 which may be operated to connect the secondary windings either in star or in polygon. The output potential of the secondary windings are connected to a full-wave rectifier 16 having phase shifting means 17 for controlling the commutation angle and the output of which is connected to a direct current motor 20 having two armature windings 21—22. The direct current motor 20 is shown as directly coupled to the driving shaft 23 of the alternating current motor 10, but obviously this connection can be made by any suitable mechanical means.

At maximum motor speed the output potential of the secondary is at a minimum and also the output frequency is very low usually of the order of 5% of the supply frequency and the frequency and potential of the output increase from full speed to minimum speed.

When operating the motor drive in the high speed range above approximately 75% of full speed it is desirable to secure the maximum available potential for applying to the rectifier 16 and the motor 20. We accordingly actuate the switch 13 to connect the primary windings in polygon and the switch 14 to connect the secondary windings in star while the direct current windings are connected in parallel by means of switch 28. Speed adjustment within the speed range of the connection is secured by operating the phase shifter 17 to retard the phase of the control potential supplied by the control device 25 which controls the application of the control impulses to the control electrodes herein shown as make-alive electrodes 26. Retarding the firing time of the rectifier device, however, reduces the power factor of the motor drive and for this reason, as well as for the increasing terminal voltage which increases the stress on the rectifier, it is not desirable to use the control of valves 27 to further decrease the speed.

For intermediate speeds between 75% and 55% of full speed it is desirable to secure an intermediate voltage and we secure such voltage by actuating the switch 14 to connect the secondary windings in polygon and the control delay again used to secure control within the intermediate speed range.

For speed below speeds of the order of 55% of full speed it is desirable to reduce the terminal voltage as much as possible therefore we actuate switch 13 to connect the primary windings in star while switch 14 connects the secondary in polygon. Also it is frequently desirable to reduce the stress on the direct current windings and the switch 28 is operated to connect windings 21 and 22 in series.

By combining switching and rectifier control it is possible to operate over a wide speed range with a minimum amount of delay in the rectifier or thus secure maximum power factor over the entire operating range.

Obviously in place of or in addition to the parallel-series connection of the direct current armature windings it would be possible to utilize sectionalized secondary windings and provide means such as speed responsive switching means to connect the sections in parallel as the lower speeds and thus further minimize the voltage increase at the lower speed range.

It will be apparent that these variations in connections will secure as near as possible a constant potential for the rectifying device and for the direct current machine regardless of the tendency of the alternating current machine to increase its terminal voltage with decrease in speed. The equalization of the terminal voltage throughout the entire speed range permits the utilization of the rectifying equipment and the direct current motor at substantially its maximum rating throughout the entire speed ratings and such connection has been found to reduce by approximately 50% the required rating of the rectifying and direct current equipment.

While for purposes of illustration we have shown and described a specific embodiment of our invention, it will be apparent that changes and modifications can be made therein without departing from the true spirit of our invention or the scope of the appended claims.

We claim as our invention:

1. A variable speed motor drive comprising a source of substantially constant potential alternating current energy, an alternating current motor having a plurality of independent primary windings, switching means for selectively connecting said windings to said source either in polygon or star connection, a plurality of substantially independent secondary windings in said motor, switching means for selectively connecting said secondary windings in either polygon or star connection, an output circuit energized by said secondary windings, a full-wave rectifier fed by said output circuit, a direct current motor coupled to said alternating current motor and connections for supplying the output of said rectifier to said direct current motor.

2. A variable speed motor drive comprising a source of substantially constant potential alternating current energy, an alternating current motor having a plurality of independent primary windings, switching means for selectively connecting said windings to said source either in polygon or star connection, a plurality of substantially independent secondary windings in said motor, switching means for selectively connecting said secondary windings in either polygon or star connection, an output circuit energized by said secondary windings, a full-wave rectifier fed by said output circuit, a direct current motor coupled to said alternating current motor and connections for supplying the output of said rectifier to said direct current motor, said direct current motor having a plurality of armature windings and switching means for energizing said armature windings either in series or in parallel from said rectifier.

3. A variable speed motor for connection to a polyphase alternating current supply comprising a motor having an inducing and an induced winding, each of said windings including a plurality of substantially independent phase windings, switching means for varying the ratio of transformation between said windings, a full wave rectifier connected to said induced winding, a direct current motor having a plurality of windings and connections including switching means for connecting said windings either in parallel or in series across said rectifier.

4. A variable speed motor for connection to a polyphase alternating current supply comprising a motor having an inducing and an induced winding, each of said windings including a plurality of substantially independent phase windings, switching means for varying the ratio of transformation between said windings, a full wave rectifier connected to said induced winding, control means for said rectifier for varying the current drawn from said induced winding, a direct current motor having a plurality of windings and connections including switching means for connecting said windings either in parallel or in series across said rectifier.

HENRY C. MYERS.
LEE A. KILGORE.